(12) United States Patent  
Ramamurthy et al.

(10) Patent No.: US 12,221,897 B2
(45) Date of Patent: Feb. 11, 2025

(54) AUTOMATED IDENTIFICATION OF COOLING HOLES AND TOOLPATH GENERATION

(71) Applicant: GENERAL ELECTRIC COMPANY, Schenectady, NY (US)

(72) Inventors: Rajesh Ramamurthy, Niskayuna, NY (US); Kevin George Harding, Niskayuna, NY (US); Jonathan Matthew Lomas, Greenville, SC (US); Vadim Bromberg, Niskayuna, NY (US)

(73) Assignee: GE INFRASTRUCTURE TECHNOLOGY LLC, Greenville, SC (US)

(*) Notice: Subject to any disclaimer, the term of this patent is extended or adjusted under 35 U.S.C. 154(b) by 923 days.

(21) Appl. No.: 17/277,087

(22) PCT Filed: Sep. 28, 2018

(86) PCT No.: PCT/US2018/053613
§ 371 (c)(1),
(2) Date: Mar. 17, 2021

(87) PCT Pub. No.: WO2020/068130
PCT Pub. Date: Apr. 2, 2020

(65) Prior Publication Data
US 2021/0383030 A1    Dec. 9, 2021

(51) Int. Cl.
*G06F 30/10* (2020.01)
*F01D 5/00* (2006.01)
(Continued)

(52) U.S. Cl.
CPC ............ *F01D 5/005* (2013.01); *G06F 30/10* (2020.01); *G06F 30/20* (2020.01); *G06T 3/40* (2013.01);
(Continued)

(58) Field of Classification Search
CPC . F01D 5/005; G06T 7/536; G06T 3/40; G06T 7/0004; G06T 15/04; G06T 15/20;
(Continued)

(56) References Cited

U.S. PATENT DOCUMENTS 6,912,446 B2    6/2005  Wang et al.
8,208,711 B2    6/2012  Venkatachalam et al.
(Continued)

FOREIGN PATENT DOCUMENTS

CN    102608954 A  *  7/2012
EP       3168808 A1     5/2017
(Continued)

OTHER PUBLICATIONS

Japanese Notice of Appeal for Application No. 2021-512415, dated Jul. 12, 2023, 8 pgs.
(Continued)

*Primary Examiner* — Juan C Ochoa
(74) *Attorney, Agent, or Firm* — Fletcher Yoder, P.C.

(57) ABSTRACT

A method of processing a part includes: identifying (2502) a location of at least one hole (62) disposed in the part using a computer-aided design (CAD) model of the part (36); aligning (2504) the part in a mounting system (56); 3D-scanning (2506) the part (36); detecting (2520) at least one boundary feature of the hole (36) based at least partially on at least one datum from 3D-scanning (2506) the part; and generating (2536) a first toolpath (92) based at least partially on the boundary feature.

21 Claims, 16 Drawing Sheets

(51) Int. Cl.
  *G06F 30/20* (2020.01)
  *G06T 3/40* (2024.01)
  *G06T 7/00* (2017.01)
  *G06T 7/536* (2017.01)
  *G06T 15/04* (2011.01)
  *G06T 15/20* (2011.01)
  *G06V 10/44* (2022.01)
  *G06F 119/08* (2020.01)

(52) U.S. Cl.
  CPC ............ *G06T 7/0004* (2013.01); *G06T 7/536* (2017.01); *G06T 15/04* (2013.01); *G06T 15/20* (2013.01); *G06V 10/44* (2022.01); *G06F 2119/08* (2020.01); *G06T 2207/10028* (2013.01); *G06T 2207/30164* (2013.01)

(58) Field of Classification Search
  CPC . G06T 2207/10028; G06T 2207/30164; G06F 30/20; G06F 30/10; G06F 2119/08; G06V 10/44; F05D 2230/80; F05D 2260/607; Y02T 50/60
  USPC ........................................................ 703/7, 1
  See application file for complete search history.

(56) References Cited

U.S. PATENT DOCUMENTS

| | | | |
|---|---|---|---|
| 8,414,264 B2 | 4/2013 | Bolms et al. | |
| 8,422,765 B2 | 4/2013 | Tsai et al. | |
| 8,996,156 B2 | 3/2015 | Melzer-Jokisch et al. | |
| 9,089,949 B2 | 7/2015 | Hunt | |
| 9,384,413 B2 | 7/2016 | John et al. | |
| 9,522,426 B2 | 12/2016 | Das et al. | |
| 9,760,986 B2 * | 9/2017 | Ramamurthy | G06T 7/0006 |
| 10,126,117 B1 * | 11/2018 | Byers | G01B 11/005 |
| 10,907,502 B2 | 2/2021 | Bromberg et al. | |
| 2004/0083024 A1 | 4/2004 | Wang | |
| 2004/0265488 A1 * | 12/2004 | Hardwicke | F01D 5/186 |
| | | | 204/192.1 |
| 2009/0220349 A1 | 9/2009 | Bolms et al. | |
| 2009/0270014 A1 | 10/2009 | Miller et al. | |
| 2012/0179285 A1 | 7/2012 | Melzer-Jokisch et al. | |
| 2013/0231892 A1 | 9/2013 | Franke et al. | |
| 2014/0154954 A1 | 6/2014 | Hunt | |
| 2014/0163717 A1 | 6/2014 | Das et al. | |
| 2014/0185912 A1 * | 7/2014 | Lim | G06T 7/001 |
| | | | 382/141 |
| 2014/0233820 A1 | 8/2014 | Wu et al. | |
| 2015/0190890 A1 | 7/2015 | Ozurk et al. | |
| 2015/0369059 A1 | 12/2015 | Burd et al. | |
| 2016/0055268 A1 | 2/2016 | Bell et al. | |
| 2016/0252420 A1 | 9/2016 | Koonankeil | |
| 2017/0132775 A1 | 5/2017 | Ramamurthy et al. | |
| 2017/0216981 A1 * | 8/2017 | Lee | B23P 11/005 |

FOREIGN PATENT DOCUMENTS

| | | |
|---|---|---|
| JP | 2004144091 A | 5/2004 |
| JP | 2009510302 A | 3/2009 |
| JP | 2014163898 A | 9/2014 |
| JP | 2017090456 A | 5/2017 |

OTHER PUBLICATIONS

Japanese Office Action for Application No. 2021-512415, dated Jul. 27, 2022, 13 pgs.

Kissel et al., "Alstom's Reconditioning Technologies for Film Cooled Single Crystal (SX) Turbine Blading", Turbine Technical Conference and Exposition, http://proceedings.asmedigitalcollection.asme.org/proceeding.aspx?articleid=1694595, vol. 5, pp. 31-40, Jun. 11-15, 2012.

Motta et al., "A Specialized Robotic System Prototype for Repairing Surface Profiles of Hydraulic Turbine Blades", 3rd International Conference on Applied Robotics for the Power Industry (CARPI), http://ieeexplore.ieee.org/document/7030073/, Oct. 14-16, 2014.

Munkelt et al., "Automatic Complete High-Precision Optical 3D Measurement of Air Cooling Holes of Gas Turbine Vanes for Repair", "Optical Measurement Systems for Industrial Inspection IX", http://proceedings.spiedigitallibrary.org/proceeding.aspx?articleid=2345164, Jun. 22, 2015.

PCT International Search Report and Written Opinion; Application No. PCT/US2018/053613; dated Jun. 26, 2019; 12 pages.

Japanese Notice of Allowance for Application No. 2021-512415, dated Feb. 14, 2024, 5 pgs.

* cited by examiner

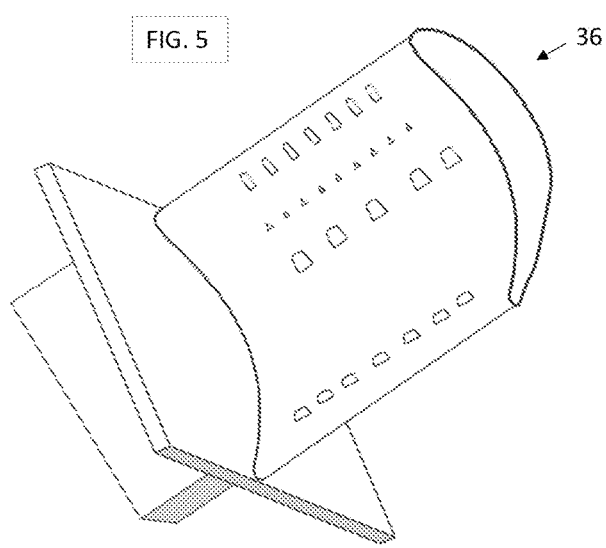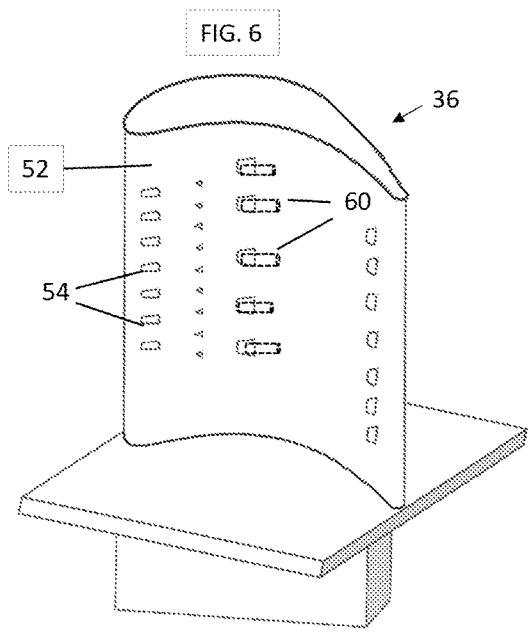

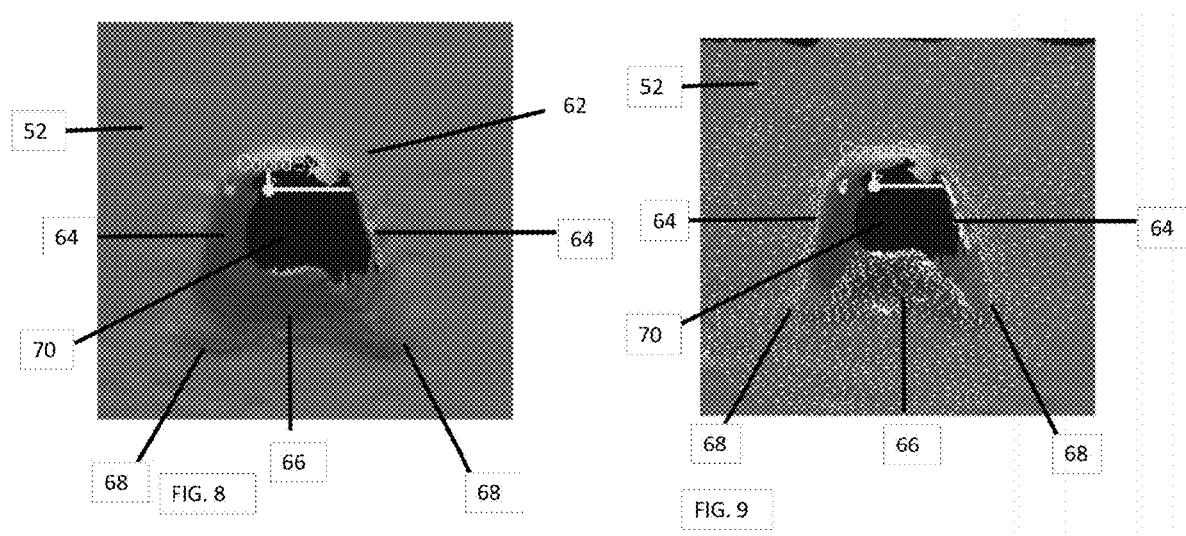

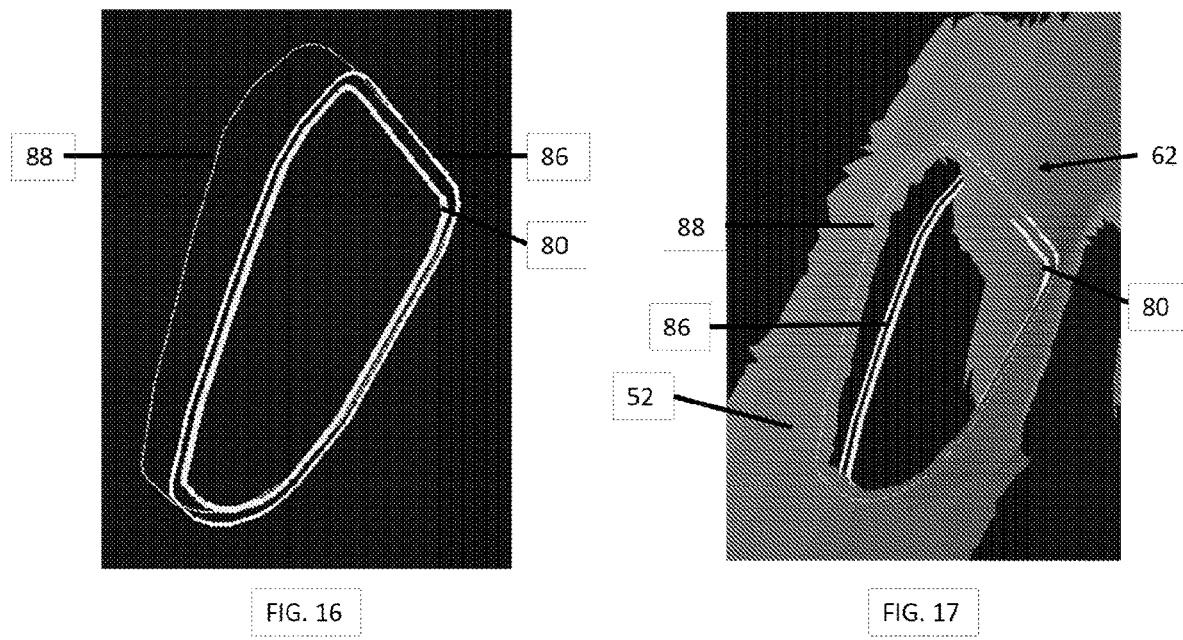

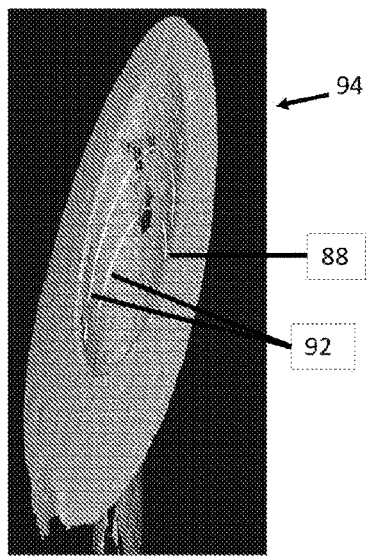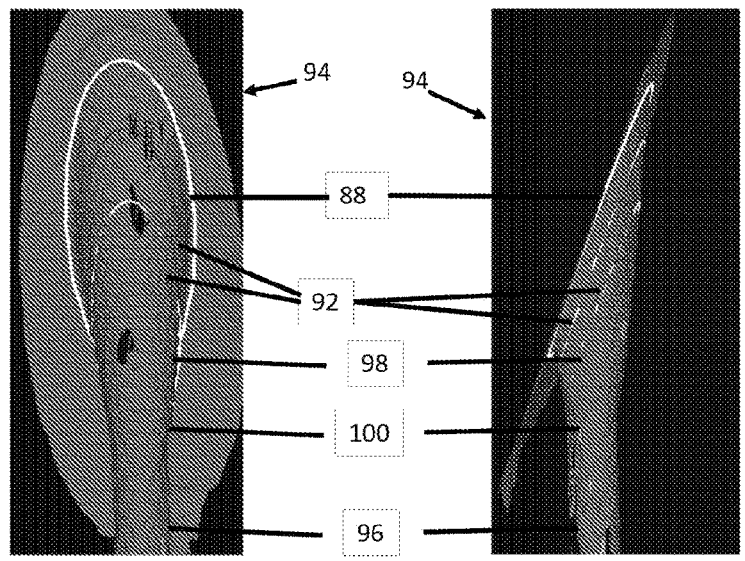
FIG. 25　　FIG. 26　　FIG. 27

AUTOMATED IDENTIFICATION OF COOLING HOLES AND TOOLPATH GENERATION

BACKGROUND

The disclosure relates generally to cooled structures of a gas turbine and more specifically systems and methods relating to turbine airfoils.

In a large frame heavy-duty industrial gas turbine engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature may be limited to the material properties of the turbine, especially the first stage vanes and blades, and an amount of cooling capability for these first stage airfoils.

The first stage rotor and stator components are exposed to the highest gas stream temperatures, with the temperature gradually decreasing as the gas stream passes through the turbine stages. The first and second stage airfoils (blades and vanes) should be cooled by passing cooling air through internal cooling passages and discharging the cooling air through film cooling holes to provide a blanket layer of cooling air to protect the cooled surface from the hot gas stream.

The turbine rotor blades, stationary vanes, and cooling passages therein often require inspection, for example, to determine if cooling passages have become blocked and/or to determine if the geometry of the parts have deviated from the intended design. However, due to the large number of turbine airfoils (blades and vanes) in a gas turbine engine, as well as the often-large number of cooling passages and holes within each airfoil, manually inspecting each hole is a time-consuming undertaking.

SUMMARY

Aspects and advantages of the disclosure will be set forth in part in the following description, or may be learned through practice of the disclosure.

In one embodiment, a method of processing a part includes: identifying 2502 a location of at least one hole 62 disposed in the part using a computer-aided design (CAD) model of the part 36; aligning 2504 the part in a mounting system 56; 3D-scanning 2506 the part 36; detecting 2520 at least one boundary feature of the hole 36 based at least partially on at least one datum from 3D-scanning 2506 the part; and generating 2536 a first toolpath 92 based at least partially on the boundary feature.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIG. 5 is an exemplary view of an airfoil;

FIG. 6 is an exemplary view of an airfoil;

FIG. 8 is an enlarged view of a portion of a substrate containing a cooling hole;

FIG. 9 is an enlarged view of a portion of a substrate containing a cooling hole;

FIG. 16 is an enlarged view of a portion of a substrate containing a cooling hole;

FIG. 17 is an enlarged view of a portion of a substrate containing a cooling hole;

FIG. 25 is a top view of a toolpath;

FIG. 26 is a bottom view of a toolpath;

FIG. 27 is a side view of a toolpath; and

Figure 1:
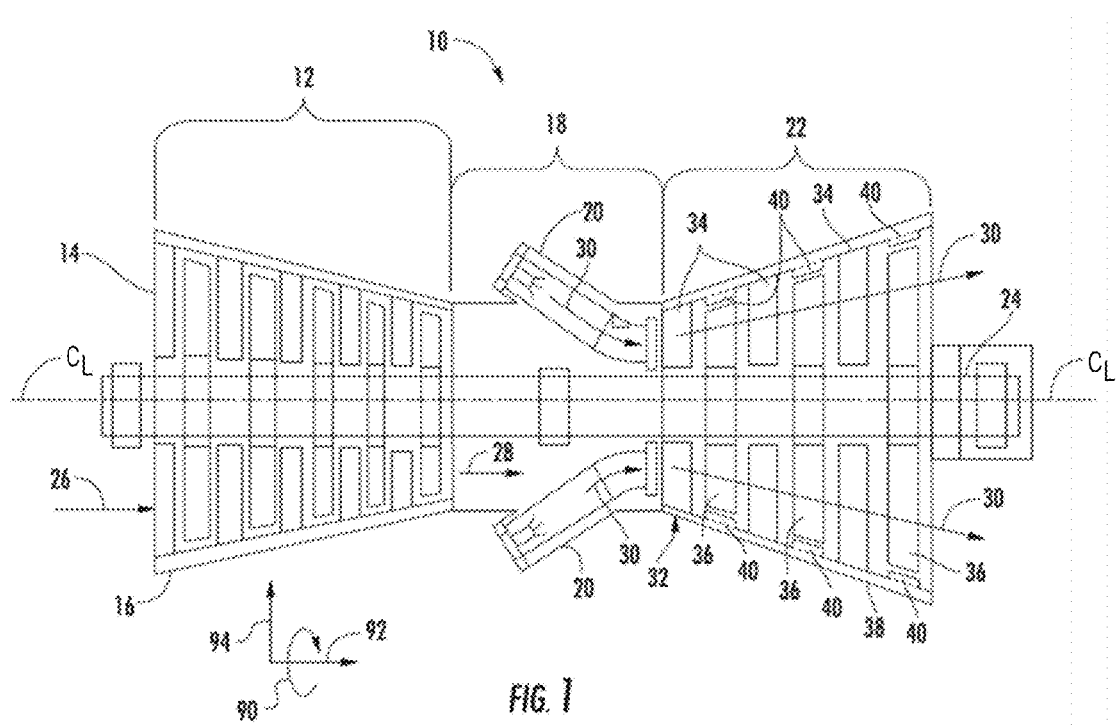
FIG. 1 is a schematic of a typical gas turbine that may incorporate embodiments of the present specification.

Repeat use of reference characters in the present specification and drawings is intended to represent the same or analogous features or elements of the present disclosure.

DETAILED DESCRIPTION

Reference will now be made in detail to aspects of the present embodiments, one or more examples of which are illustrated in the accompanying drawings. The detailed description uses numerical and letter designations to refer to features in the drawings. Like or similar designations in the drawings and description have been used to refer to like or similar parts of the present embodiments. As used herein, the terms "first", "second", and "third" may be used interchangeably to distinguish one component from another and are not intended to signify location or importance of the individual components. The terms "upstream" or "aft", and "downstream" or "forward" refer to the relative direction with respect to fluid flow in a fluid pathway. For example, "upstream" or "aft" refers to the direction from which the fluid flows, sometimes referred to as 'rear'. "Downstream" or "forward" refers to the direction to which the fluid flows, sometimes referred to as 'front'. The term "radially" refers to the relative direction that is substantially perpendicular to an axial centerline of a particular component, and the term "axially" refers to the relative direction that is substantially parallel to an axial centerline of a particular component. The terms "circumferential" and "tangential" may refer to the direction aligned with the circumference of a rotating turbine or compressor rotor.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Each example is provided by way of explanation of the present embodiments, not limitation of the present embodiments. In fact, it will be apparent to those skilled in the art that modifications and variations can be made in the present embodiments without departing from the scope or spirit thereof. For instance, features illustrated or described as part of one embodiment may be used on another embodiment to yield a still further embodiment. Thus, it is intended that the present embodiments cover such modifications and variations as come within the scope of the appended claims and their equivalents. Although exemplary aspects of the present embodiments will be described generally in the context of a gas turbine for purposes of illustration, one of ordinary skill in the art will readily appreciate that aspects of the present embodiments may be applied to any turbomachine and is not limited to an industrial gas turbine unless specifically recited in the claims. Although an industrial, marine, or land-based gas turbine is shown and described herein, the present disclosure as shown and described herein is not limited to a land based and/or industrial, and/or marine gas turbine unless otherwise specified in the claims. For example, the disclosure as described herein may be used in any type of turbine including but not limited to an aero-derivative turbine or marine gas turbine as well as an aero engine turbine, and/or aircraft engines.

Referring now to the drawings, wherein like numerals refer to like components, FIG. 1 illustrates an example of a gas turbine 10 which may incorporate various aspects of the present embodiments. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10. FIG. 1 illustrates the radial 94, axial 92 and circumferential directions 90.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. The rotor shaft 24 rotates about an engine centerline CL. A turbine casing 38 at least partially encases the rotor blades 36 and the turbine nozzles 34. Each or some of the rows of rotor blades 36 may be concentrically surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition, or in the alternative, the shaft 24 may be used to drive the compressor section 12 of the gas turbine.

Figure 2:
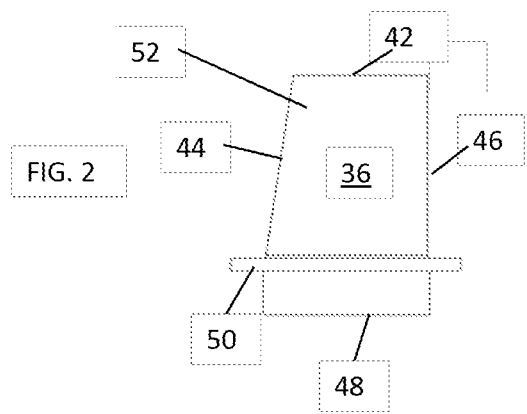
FIG. 2 is an enlarged cross section side view of a portion of an exemplary turbine rotor blade.

FIG. 2 provides an enlarged cross section side view of an exemplary turbine rotor blade or airfoil 36, which extends from an axially forward leading edge 44 to an axially aft trailing edge 46 and from a radially inward root 48 to a radially outer tip 42. The airfoil 36 includes a platform 50 defining a radially inner boundary of a hot gas path. The airfoil 36 also includes at least one substrate 52 into which a cooling hole such as a film cooling hole (not shown) may be disposed. The substrate including the cooling hole may be on any portion of the airfoil including the leading edge 44, the trailing edge 46, the tip 42, as well as on an airfoil pressure side and/or an airfoil suction side. The airfoil 36 of FIG. 2 is used as an exemplary component for illustrating the systems and methods described herein, which apply also to turbine vanes, turbines nozzles, combustor liners, shrouds, as well as other components that include substrates and/or surfaces with cooling holes disposed therein.

Figure 3:
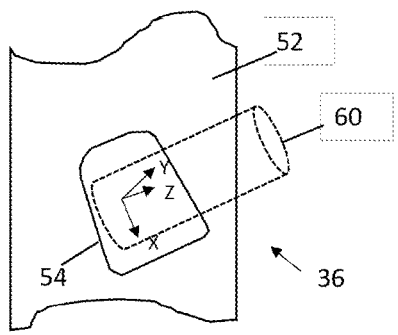
FIG. 3 is an enlarged view of a portion of a substrate containing a cooling hole.

FIG. 3 illustrates a portion of a substrate 52 of airfoil 36 including a cooling hole 54. A computer-aided design (CAD) model may be used to identify the locations of cooling holes 54. Each cooling hole 54 can be represented in CAD by a cylinder 60, where the centerline of z-axis of the cylinder 60 is aligned with the location and orientation of the center of the cooling hole 54. The diameter of the cylinder 60 may be sized to match a bore diameter of the cooling hole 54. As such, many aspects of the geometry of the cooling hole 54 may be represented in CAD using a cylinder. In other embodiments, elliptical, trapezoidal, triangular, rectangular and/or other shaped prisms may be used to represent the geometry of the cooling hole 54, and the shape that is used may depend on the cross-sectional shape of the cooling hole 54. FIG. 3 also illustrates an x-y-z coordinate system where the z-axis may be aligned to be normal to the local surface or substrate 52, in the vicinity of the cooling hole 54. The zero point or origin of the z-axis (as well as the zero point of the x-y-z coordinate system generally) may be chosen as the internal center of the cooling hole 54.

Figure 4:
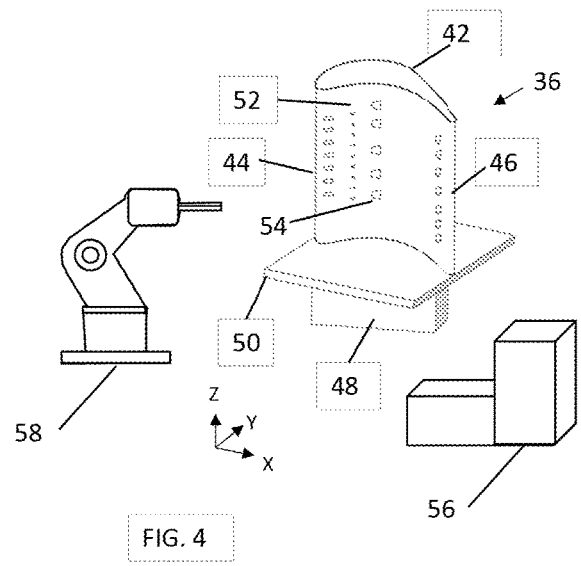
FIG. 4 is an exemplary view of an airfoil, an alignment system and a mounting system.

FIG. 4 illustrates an exemplary airfoil 36 including a leading edge 44, a trailing edge 46, an airfoil tip 42, an airfoil root 46, and an airfoil platform 50. In the embodiment of FIG. 4, several cooling holes 54 are disposed in a substrate 52 of the airfoil 36. FIG. 4 illustrates the airfoil 36 being aligned relative to an x-y-z coordinate system, and a mounting system 56. For example, an x-axis may be defined along a circumferential edge of the airfoil platform, a y-axis may be defined along an axial edge of the platform, and the z-axis may be aligned along the leading edge and/or other radially extending portion of the airfoil 36. Other coordinate systems may also be defined. A 6-axis robot arm 58 and/or other alignment tools may be used to align the airfoil 36 relative to the mounting system 56 such that the x-y-z coordinate system is precisely aligned on the airfoil. Robotic alignment of the airfoil 36, mounting system 56, and x-y-z coordinate system may be performed using camera views provided by a camera onboard the 6-axis robot arm 58, as well as other instrumentation including calipers, depth gauges, proximity gauges, gyroscopes, markers, locating features, and/or alignment features on the airfoil 36. Other types of gages or probes that may be used include structured light, point confocal, conoscopic or interferometric probes, either in conjunction with the robot on in a fixed arrangement to establish alignment. In addition, a precision mechanical fixture may be used to align the part using known data points in accordance with the part model. Following alignment of the airfoil 36, mounting system 56, and x-y-z coordinate system, an initial 3D scan of the airfoil 36 can me made using a 3D scanner. The 3D scanner may consist of: a laser stripe system, a triangulation-based structured light system, a phase shift-based white light scanner, a point scanning confocal system, a laser radar system, a stereo photogrammetry system, a depth-from-focus-based camera system, a mechanical touch-based system or any combination of the above. The alignment and scanning systems may be combined into a single system or may be two or more individual systems. Using separate alignment and scan systems and/or machines may allow each system to be fulfill only a single purpose, which may allow for an improvement in the accuracy of each system. In addition, using separate alignment and scan systems and/or machines may allow for an improvement of the overall process since the systems may be operating independently and/or simultaneously.

FIG. 5 illustrates an airfoil 36 that is skewed relative to measurement data received via the 3D scanner in FIG. 4. Stated otherwise, the 3D measurement data acquired by the 3D scanner is transformed such that it aligns with the hole x-y-z coordinate system established in FIG. 4. The 3D measurement data acquired by the scanner may be converted from an unstructured 3D point cloud into a structured 3D point cloud data with regional neighborhood information such as local normal and connectivity, such as, for example, by a 3D triangulation of points. Such structured data cloud may be referred to as a 3D mesh, a data mesh, a 3D data mesh, and/or a 3D measurement data mesh and may be transferred from the scanner to other processing systems using various file formats including stereolithography (.stl), VRML, or Wavefront data format to retain the data structure.

FIG. 6 illustrates an airfoil 36 including several cooling holes 54 disposed in an airfoil substrate 52, and cylinders 60 disposed within several of the cooling holes. The 3D measurement data acquired by the 3D scanner is transposed into the cylinder coordinate system such that each datum from the 3D measurement data lies either within or outside of the volume of the cylinder 60 of the cooling hole 54 to which it is associated. The transformation of the 3D measurement data into the cylinder coordinate may be performed via various methods including matrix transformation that relate the inspection coordinate system with the hole coordinate system.

Figure 7:
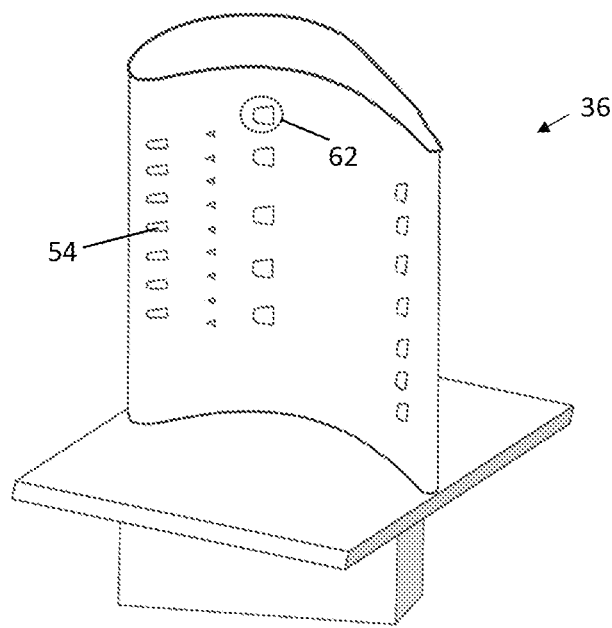
FIG. 7 is an exemplary view of an airfoil.

FIG. 7 illustrates an airfoil 36 including a cooling hole 62 that has been selected for further processing. The cooling hole 62 may have been selected using various criteria including 3D measurement data within the volume of the cylinder 60 (not shown) that exceeds a certain criterion or criteria. For example, a cooling hole 62 may be selected if the 3D measurement data suggests the presence of foreign material such as residual and/or fraying thermal barrier coating (TBC) as well as other foreign materials within the volume of the cylinder (and thus within the cooling hole 62). Stated otherwise, if the volume of foreign material exceeds a predetermined threshold volume (for example of percentage of the cylinder volume), the cooling hole 62 may be selected for further processing. Similarly, the cooling hole 62 may also be selected for further processing if the 3D measurement data suggests that foreign material is present at a range of cooling hole depths (i.e., relative to a z-axis of the cylinder coordinate system.) At least one additional 3D scan may be performed on any cooling hole 62 that is selected for further processing. Other foreign materials may include fraying bond coats, environmental barrier coatings (EBC), deposits, contaminants, foulants, oxidation, as well as other materials. A hole may also be selected because of possible damage, missing material or significant mis-positioning.

FIG. 8 illustrates an enlarged view of a cooling hole 62 disposed within a substrate 52 of an airfoil 36 (not shown). The cooling hole 62 may include one or more sidewalls 64, and one or more downstream corners 68 at the cooling hole exit portion where the cooling hole intersects the plane of the substrate 52. The cooling hole 62 may also include a ramp portion 66 which defines the transition between a cooling hole metering section and the cooling hole exit. The ramp portion 66 may be substantially planar or have an aerodynamic shape. The cooling hole 62 may also include a central bore portion 70.

FIG. 9 illustrates an enlarged view of the cooling hole 62 of FIG. 8, with point cloud data mapped on top of it. The point cloud is a series of measurement data points for which there has been no connections or ordering established associating points with regard to adjacency, surface fitting or other mathematical model connection between the points. The only information known about each point is the X-Y-Z coordinates of that point. Only this point data will be used to evaluate localized trends or changes, rather than the conventional approach of lofting the individual points onto a mathematical surface of curves or small surface regions, based upon nominal model geometries, then using these surfaces to determine geometric features. Using fitted mathematical surfaces is both time consuming and can lose or bias very localized features which exist within the point cloud data due to the shape or location of other non-hole features in the mathematical surface model. The point cloud data may be collected during the second or subsequent 3D scan on the cooling holes 62 selected for further processing, as well as via other processes. The point cloud data may be representative of the orientations of the direction normal to the surface in each location. Similarly, the point cloud data may be representative of changing normal surface orientations. As such, the point cloud data may be used to identify areas where the surface normal orientations are constant relative to other points in the immediate vicinity (such as planar portions like the substrate 52 and the ramp portion 66). The point cloud data may be used to identify areas where the surface normal orientations are rapidly changing such as the downstream corners 68 and the sidewalls 64. The point cloud data may be used to identify areas where no surface normal orientations are present, such as at the cooling hole central bore portion 70. The point cloud data may be used to identify areas where the surface normal orientations are orthogonal relative to a 3D scan direction (for example, the z-axis) such as the substrate 52. Using the point cloud data as described allows for multiple attributes of the geometry of the cooling hole 62 to be identified without bias or averaging effects of other features on a part that could influence mathematically-fitted surfaces, which in turn allows for multiple methods of identifying the boundaries of the cooling hole 62, even if the as-measured cooling hole geometry deviates from the nominal cooling hole geometry or expected location.

Figure 10:
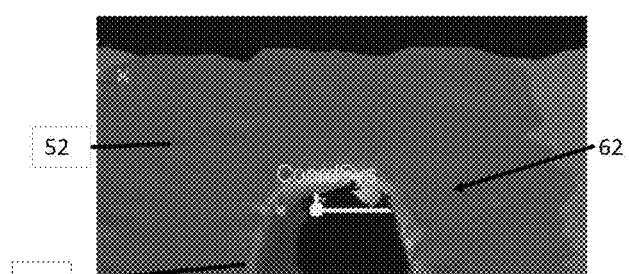
FIG. 10 is an enlarged view of a portion of a substrate containing a cooling hole.

FIG. 10 illustrates an enlarged view of the cooling hole 62 of FIGS. 8 and 9, including a first pass at identifying the substrate 52 and a rough hole boundary 72 using the point cloud data and substrate surface normality.

Figure 11:
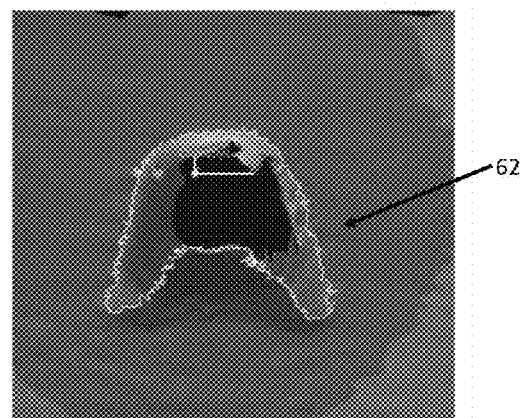
FIG. 11 is an enlarged view of a portion of a substrate containing a cooling hole.

FIG. 11 illustrates an enlarged view of the cooling hole 62 of FIGS. 8-10, including a refined mapping of the hole boundary 72 using the downstream corner and/or ramp portion cloud point data, the substrate 52, and a rough hole boundary 72 using the point cloud data and substrate surface normality.

Figure 12:
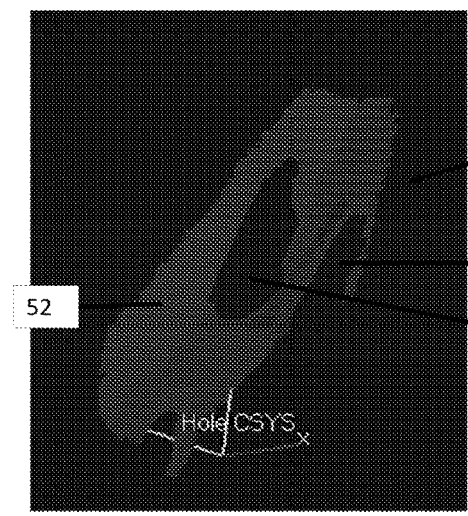
FIG. 12 is an enlarged view of a portion of a substrate containing a cooling hole.

FIG. 12 illustrates an enlarged view of a representation of the cooling hole 62 including portions with normal surface orientations such as the substrate 52, as well as a first non-normal surface portion 74 and a second non-normal surface portion 76.

Figure 13:
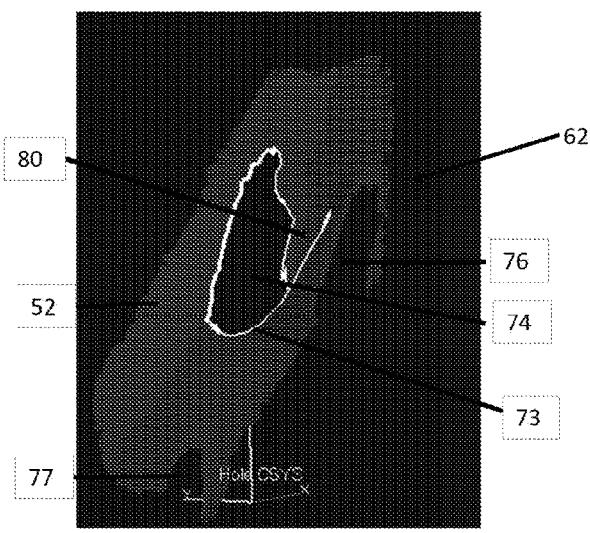
FIG. 13 is an enlarged view of a portion of a substrate containing a cooling hole.

FIG. 13 illustrates an enlarged view of a representation of the cooling hole 62 including portions with normal surface orientations such as the substrate 52, as well as a first non-normal surface portion 74 and a second non-normal surface portion 76. In the illustration of FIG. 13, a portion of cooling hole free edge 73 is identified at the transition or edge between a portion with a normal surface orientation such as the substrate 52 and at least one of the first and second non-normal surface portions 74, 76. The cooling hole free edge 73 may have a shape that matches the geometry of the nominal part shape, in light of the cylinder coordinate system. In the illustration of FIG. 13, the cooling hole free edge 73 is identified at a transition between the substrate 52 and the first non-normal surface 74. A cooling hole free edge 73 is not identified at the transition between the substrate 52 and the second non-normal surface 76 because either the transition does not match the geometry of the nominal part datum, or the orientation does not match. A third non-normal surface 77 is also identified and also does not include a cooling hole free edge 73 that matches the criteria. Stated otherwise, both the shape and the orientation of the transitions between normal and non-normal portions may be used to identify cooling hole boundaries. The cooling hole free edge 73 may or may not coincide with the cooling hole boundary 72 (not shown). For example, the cooling hole free edge 73, which defines the transition between portions with normal surface orientations and portions with non-normal surface orientations, may be within the cooling hole 62, and thus may not define the boundary of the cooling hole. This may occur when the cooling hole boundary 72 is covered with one or more layers of debris, coatings, and/or foulants and thus may appear to have a normal surface orientation while at least one cooling hole free edge 73 (i.e., the transition between normal and non-normal surface orientation) is disposed at a depth within the cooling hole 62. As such, the cooling hole free edge 73 may be an approximation of the cooling hole boundary 72 that may require scaling (due to the free edge occurring at a depth within or a height above the cooling hole 62) and/or translation due to the cooling hole free edge 73 including only a portion (for example one side) of the characteristic hole shape of the cooling hole boundary 72.

Still referring to FIG. 13, the second non-normal surface portion 76 (i.e., at a location of the substrate which would be "expected" to have a normal surface orientation) may be attributable to erosion of the substrate, spallation, deposits of foreign material, foreign object damage, as well as other forms of deterioration and/or degradation. The representation of the cooling hole 62 may include an embedded normal portion 80 which appears to have a normal orientation and thus would appear to be part of the substrate 52 surrounding the cooling hole 62, but is located in a portion of the representation of the cooling hole 62 that would be expected to be occupied by the cooling hole 62 itself. Because portions within the cooling hole 62 may "look like" the surrounding substrate 52, it may not be possible to match the geometry of the cooling hole free edge 73 precisely with the geometry of the nominal part datum. FIGS. 8-11 as well as FIGS. 12 and 13 illustrate methods of using measured surface normality data, nominal part datum geometries and their orientations relative to a predetermined coordinate system, for the purpose of identifying an initial or rough boundary of a cooling hole 62, among other possible purposes.

Figure 14:
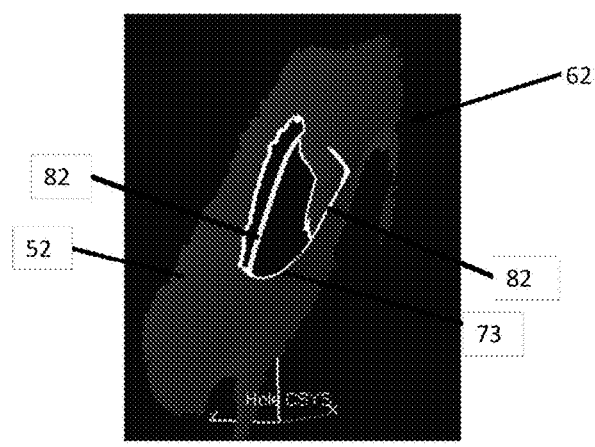
FIG. 14 is an enlarged view of a portion of a substrate containing a cooling hole.

FIG. 14 illustrates a refinement of an approximation of the cooling hole boundary 72 (not shown) of FIGS. 12 and 13 which maps a projection 82 of an expected cooling hole boundary characteristic hull shape onto the measured 3D data, which includes the cooling hole free edge 73. The characteristic hull shape may be described as a symmetrical trapezoid with rounded edges. The projection 82 may be scaled up or down in size so as to best match the cooling hole free edge 73. For example, if the deposits are present in the cooling hole 62, the cooling hole free edge 73 may appear to be a different size than the cooling hole boundary 72, not shown (i.e., the intersection of the cooling hole 62 with the substrate 52, e.g., at a zero depth or within a plane that is co-planar with the substrate 52). The outline of the cooling hole 62 may include the same characteristic shape at various depths, just scaled up or down in size (due to the, for example, the cross-sectional area and/or flow area of a diffusing portion of a film cooling hole continuing to increase as the hole transitions to the substrate 52). Additionally, scaling based on the orientation of the projection relative to the cylinder coordinate system within a predetermined tolerance may also be desired. Therefore, scaling the projection 82 to match the cooling hole free edge 73 may be necessary. The projection 82 may also be described as a hull due to the characteristic shape, as illustrated in FIG. 14.

Figure 15:
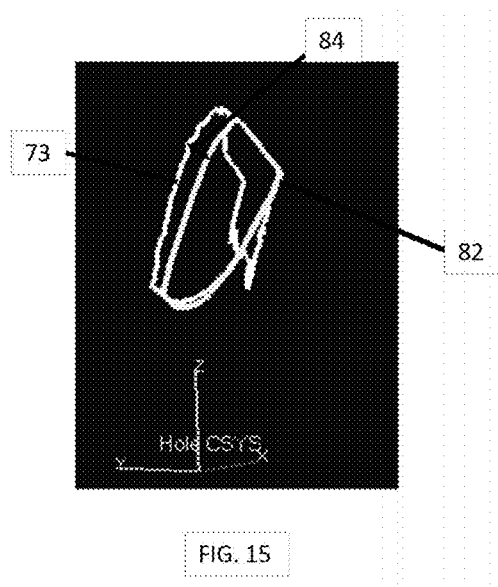
FIG. 15 is an enlarged view of a portion of a substrate containing a cooling hole.

FIG. 15 includes another refinement, illustrating only the cooling hole free edge 73 and the projection 82 of the characteristic hull shape superimposed on one another. This superposition allows at least one offset 84 to be defined. The offset 84 may be defined as a spatial displacement between a nominal position of a cooling hole feature and the location of the corresponding measurement data. The offset may include a translation relative to any axis (lateral, longitudinal, axial) and/or a rotation to match the orientation relative to the cylinder coordinate system. In addition, multiple offsets may be defined.

FIG. 16 illustrates a projection 80 of the characteristic hull shape as well as an offset hull 86 which applies the offset 84 from FIG. 15 to the projection 80 of the characteristic hull shape. FIG. 16 also illustrates a second projection 88 which approximates the cooling hole boundary 72 at a plane defined by substrate 52. Stated otherwise, the projection 80 of the characteristic hull shape and hull offset 86 may occur at a different depth and/or height than the plane defined by the substrate 52, a difference which may be approximated and accounted for by the second projection 88.

FIG. 17 illustrates the projection 80 of the characteristic hull shape, the offset hull 86, and the second projection 88 superimposed on the 3D mesh of measured data, which also illustrates the substrate 52 which is depicted as the portions with normal surface orientations. FIG. 17 illustrates that after superimposing the second projection 88 (which is a refined approximation of the cooling hole boundary 72) onto the 3D points of measured data, portions of normal surface orientation are within the projected hole boundary. Stated otherwise, portions of the measured data that were previously identified as being likely part of the substrate 52 due to their surface normality (and therefore outside of the cooling hole boundary 72), where actually determined to be within the cooling hole boundary 72 after refining the approximation. Thus, what was initially identified as part of the substrate 52 is re-identified as stray or foreign material in the cooling hole 62, upon refinement. Therefore, using the cooling hole free edge 73, the projection 80 of the characteristic hull shape, the offset hull 86, and the second projection 88 superimposed on the 3D mesh of measured data as illustrated in FIGS. 13-17, a more accurate refinement of the cooling hole boundary 72 is possible in comparison to methodologies that rely solely on surface normality data to identify cooling hole boundaries.

Figures 18, 19:
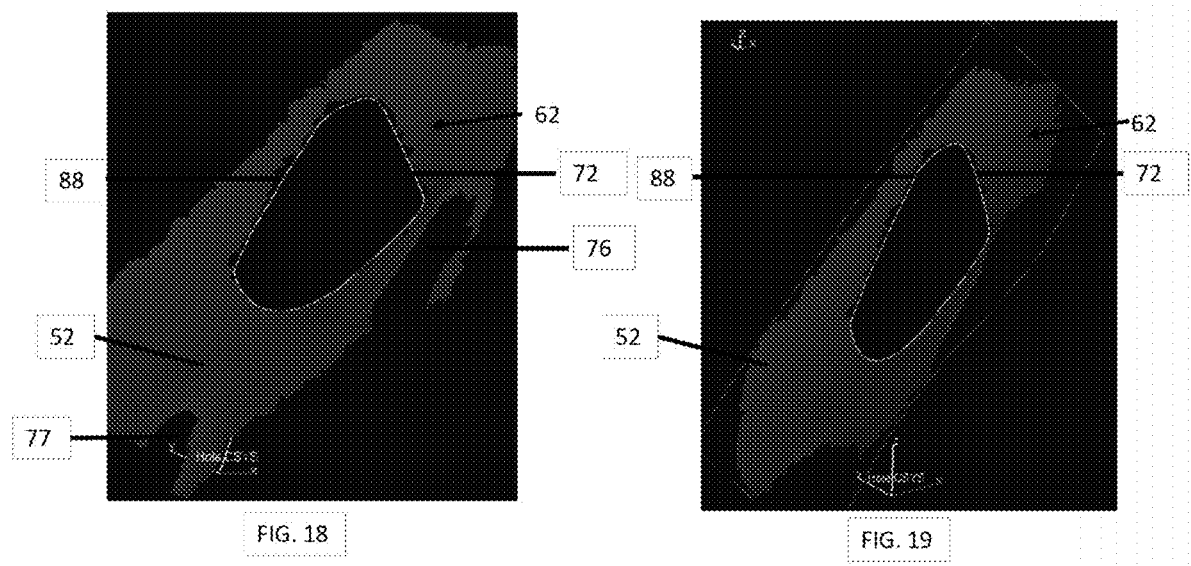
FIG. 18 is an enlarged view of a portion of a substrate containing a cooling hole.
FIG. 19 is an enlarged view of a portion of a substrate containing a cooling hole.

FIG. 18 illustrates a refined approximation of a cooling hole 62 after portions of normal surface that were within the second projection 88 (i.e., an approximation of the cooling hole boundary 72) have been removed. The second and third non-normal surfaces 76, 77 are also identified as outside of the refined cooling hole boundary 72, and therefore do not form portions of the cooling hole 62.

FIG. 19 illustrates a refined approximation of a cooling hole 62 using a higher order fit or approximation after portions of normal surface inside the second projection 88 (or cooling hole boundary approximation) as well as second and third non-normal surfaces 76, 77 (not shown) outside of the second projection 88, have been removed. Removing these outlier surfaces allows for an even more refined approximation of the cooling hole boundary. As such, additional refinements may be possible by iteratively and/or incrementally increasing the order of the fit, after discarding outlier data.

Figure 20:
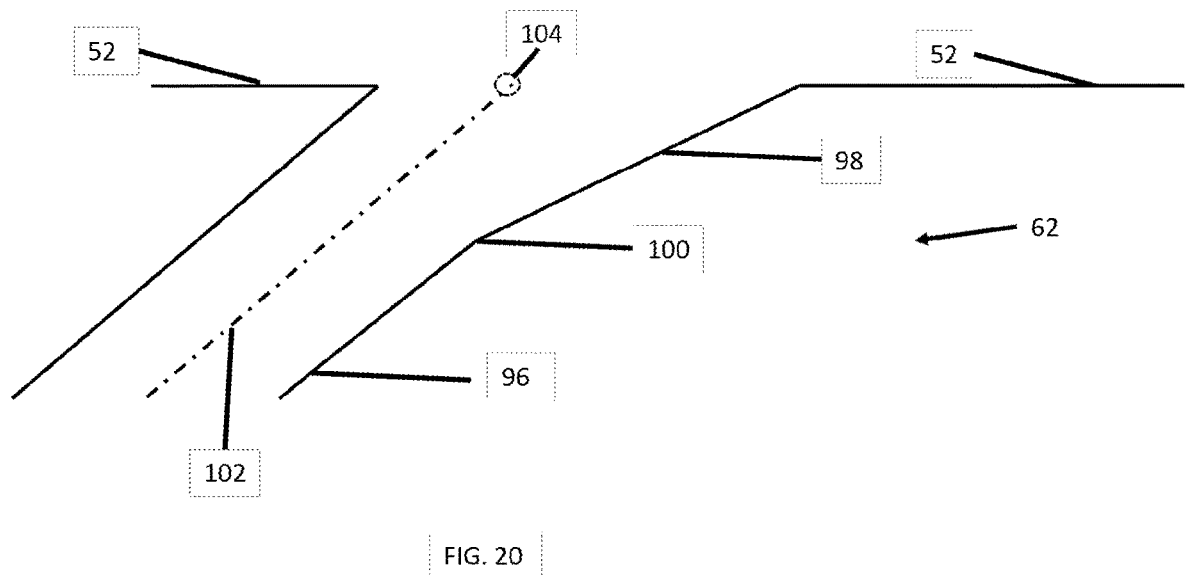
FIG. 20 is an exemplary side-view schematic of a cooling hole.

FIG. 20 illustrates a side view of an exemplary cooling hole 62 including a metering section 96, a throat 100 defining the transition to a diffusing section 98, and the substrate 52. The cooling hole 62 includes a centerline 102 as well as a Pierce point 104. The Pierce point 104 is defined at the intersection of the cooling hole centerline 102 with the plane of the substrate 52. The Pierce point 104 may be used as the origin or zero-point for the hole coordinate system. The Pierce point 104 may also be used to anchor a cooling hole boundary approximation (for example, the second projection 88) to plane in which the cooling hole boundary is defined (i.e., substrate 52).

Figures 21, 22:
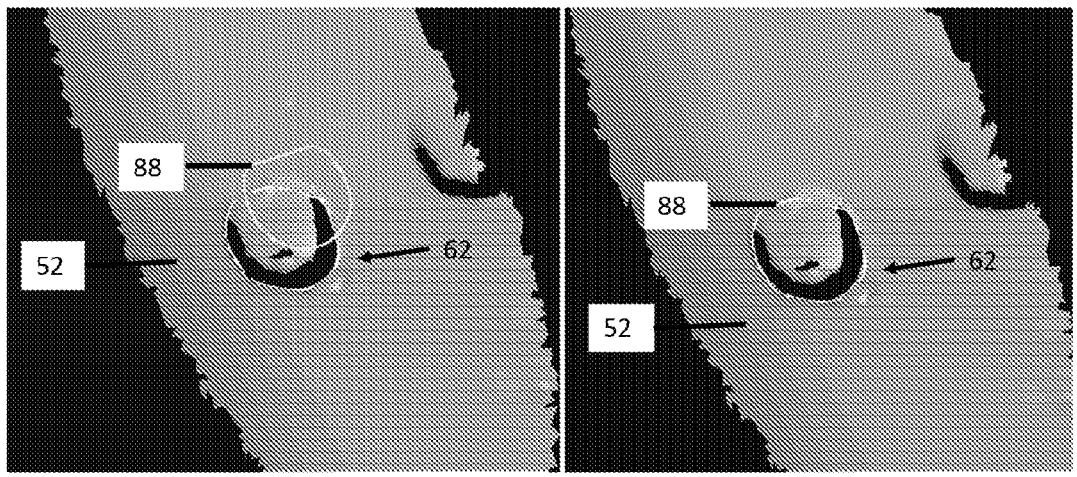
FIG. 21 is an enlarged view of a portion of a substrate containing a cooling hole.
FIG. 22 is an enlarged view of a portion of a substrate containing a cooling hole.

FIG. 21 illustrates the cooling hole 62, the substrate 52, and the second projection 88, prior to the second projection 88 being transformed to the actual cooling hole boundary.

FIG. 22 illustrates the cooling hole 62, the substrate 52, and the second projection 88, after the second projection 88 is transformed to the actual cooling hole boundary. The second projection 88 may be translated and rotated within the plane of the figure, such that it may be transformed to the best fit to match the actual cooling hole boundary. In addition, the second projection 88 may be anchored to the correct elevation or plane, using the Pierce point 104 illustrated in FIG. 20.

Figure 23:
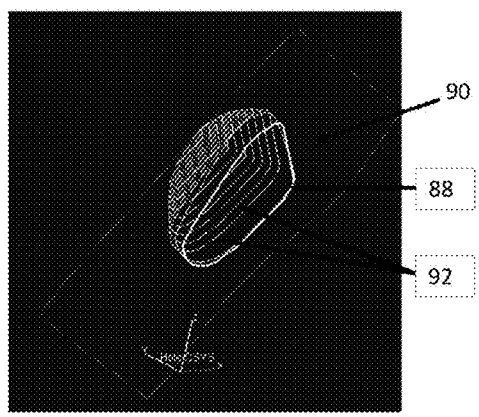
FIG. 23 is an enlarged view of a portion of a substrate containing a cooling hole.

FIG. 23 illustrates a tool path 90 constructed from multiple curves 92, which in turn are constructed from the second projection 88. The second projection 88 provides a refined approximation of the entire periphery of the cooling hole boundary 72, which is then applied at multiple depths. Each depth at which the second projection 88 is applied is represented by one of the multiple curves 92, each of which may include the characteristic hull shape and may be concentric with the second projection 88 the center of the cooling hole 62.

Figure 24:
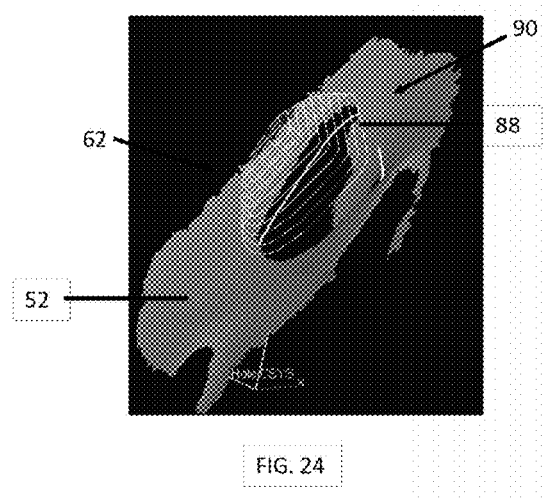
FIG. 24 is an enlarged view of a portion of a substrate containing a cooling hole.

FIG. 24 illustrates the tool path 90 resulting from the second projection 88 at multiple depths (as illustrated in FIG. 23) superimposed on a surface of the airfoil 36 including the 3D scan measurement data, which includes the cooling hole 62 and substrate 52. The tool path 90 is translated and/or rotated within the normal surface plane using the offset data such that it is aligned with the corresponding portions of the cooling hole 62 using the cylinder coordinate system.

FIGS. 25-27 illustrate a top view, bottom view, and side view, respectively, of a refined tool path 94 including the second projection 88 (i.e., a refined approximation of the cooling hole boundary 72) and multiple curves 92 at various depths. The refined tool path 94 of FIGS. 25-27 also include portions that are constructed by intersecting and/or combining the tool path 90 of FIGS. 23 and 24 with the cooling hole part geometry data. For example, the cooling hole part geometry data may include a metering section 96, which transitions to a diffusing section 98 at a cooling hole throat 100.

Figure 28:
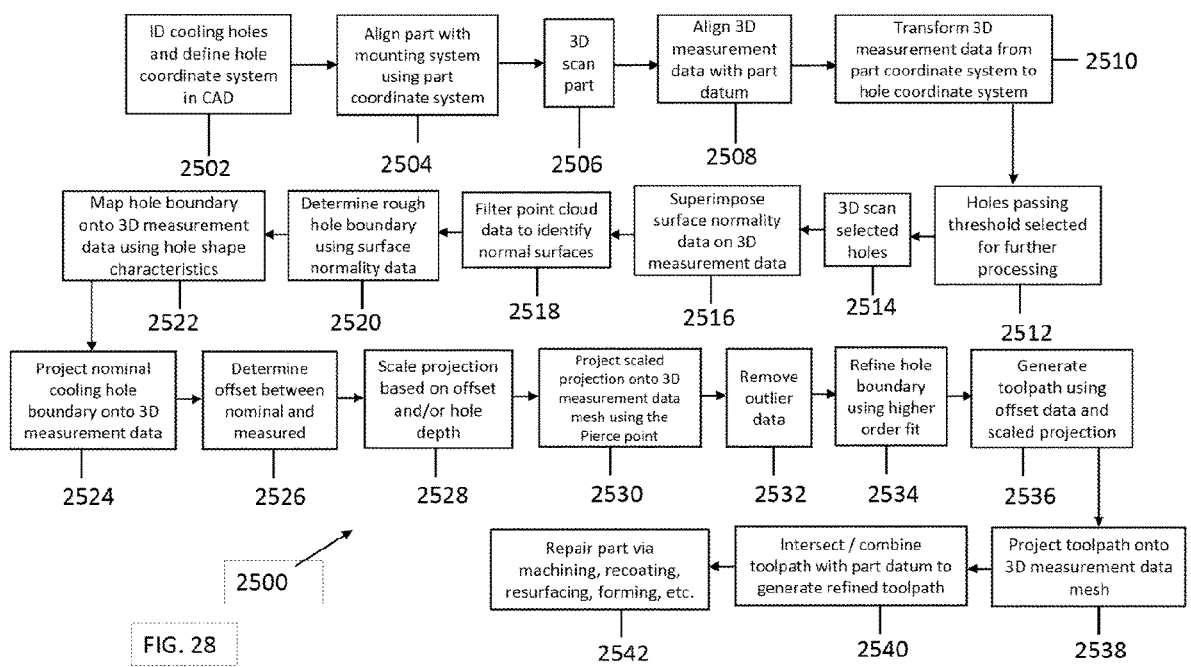
FIG. 28 is a method of repairing a component, according to various embodiments of the present disclosure.

FIG. 28 illustrates a method 2500 of repairing a part according to the embodiments disclosed herein. At step 2502, the method 2500 includes identifying cooling holes and defining a cooling hole coordinate system in CAD. The cooling hole coordinate system may include a cylinder 60 that defines a cooling hole central axis location and axis orientation, as well as the diameter of the cooling hole bore. At step 2504, the method 2500 includes aligning the part with a mounting system 56 using alignment tools such as a 6-axis robot 28. The part coordinate system may include any embodiment based on a part geometry. For example, a part coordinate system may map the x, y, and z axes to the circumferential, axial, and radial directions of a part used in turbomachinery (such as a turbine blade or turbine nozzle). Other coordinate systems are also possible. At step 2506, the method 2500 includes 3D scanning the part. At step 2508, the method 2500 includes aligning 3D measurement data from the scan of step 2506 with part geometry data as well as constructing a 3D structured point cloud data such as a triangulated mesh from the unstructured measurement point cloud. At step 2510, the method 2500 includes transforming the 3D measurement data (i.e., the data from scanning) from the part coordinate system to the hole coordinate system. At step 2512, the method 2500 includes identifying cooling holes 62 that pass a predetermined threshold for further processing. The predetermined threshold may include identifying cooling holes that include significant material (i.e., above a certain volume percentage, for example) within the volume of the cylinder 60.

Still referring to FIG. 28, at step 2514, the method 2500 may include performing a second 3D scan of only the cooling holes that were selected for further processing in step 2512. Alternatively, at step 2514, the method 2500 may include reprocessing data corresponding to the selected cooling holes using the data from the original scan (i.e., at step 2506). At step 2516, the method includes superimposing surface normality data from the second scan and/or 3D measurement data from the first scan onto part geometry data. At step 2518, the method 2500 includes filtering point cloud data to identify normal surfaces and non-normal surfaces of the cooling hole 62 and surrounding substrate 52. At step 2520, the method 2500 may include determining a rough hole boundary using surface normality data. Determining a rough hole boundary may include matching 3D scan data with nominal cooling hole characteristics such as downstream corners 68, ramp portions 66, as well as at least one cooling hole free edge 73. At step 2522, the method 2500 includes mapping the approximated cooling hole boundary onto the 3D measurement data mesh using the cooling hole shape characteristics. At step 2524, the method 2500 may include projecting a nominal cooling hole boundary onto the 3D measurement data mesh. At step 2526, the method 2500 may include determining an offset between the nominal cooling hole boundary and the measured cooling hole boundary. The offset may include a rotation and/or translation within the plate defined by the substrate 52, as well as parallel planes (to account for measurement data within the hole or at heights above the substrate 52).

Referring still to FIG. 28, at step 2528, the method may include scaling the projection based on the offset and/or hold depth data (i.e., the depth to which the measured data corresponds). At step 2530, the method may include projecting the scaled projection 88 onto the 3D measurement data mesh or structured point cloud using the Pierce point to transform the scaled projection 88 to match the actual detected boundary in each of the X, Y, and Z directions. At step 2532, the method may include removing the outlier data. The outlier data may include normal surface data identified within the scaled projection 88 (i.e., the cooling hole boundary approximation), as well as non-normal surface data outside of the scaled (or second) projection 88 (i.e., data that "looks like" the but is actually located on part of the substrate). At step 2534, the method 2500 may include refining the cooling hole boundary using a higher order fit. At step 2536, the method 2500 may include generating a toolpath using the offset data and the scaled projection 88. At 2538, the method 2500 may include projecting the toolpath onto the 3D measurement data mesh. At step 2540, the method may include intersecting and/or combining the toolpath with part geometry data to generate a refined toolpath. At step 2542, the method may include repairing the part using the refined toolpath. Repairing the part may include drilling, milling, other forms of machining, recoating, resurfacing, and/or reforming portions of the cooling hole, cooling hole boundary, cooling hole walls, and/or substrate. Stated otherwise, the repair process may include additive and/or subtractive cooling hole restoration processes. Other repair methods may also be used. In addition, reforming portions of the airfoil, part, and/or cooling hole may be performed via additive manufacturing, as well as via other processes. Method 2500 may also include other steps and sub-steps. In some embodiments, not all steps of method 2500 will be performed. In addition, various steps of method 2500 may be performed in a different order than what is shown in FIG. 28.

The methods, systems, and embodiments described here enable a rapid and automated process of clearing or masking a wide range of cooling hole geometries, and they may eliminate entirely the labor-intensive process of manual cooling hole clearance and restoration. The computation of cooling hole feature information directly via scan information can also establish the digital thread and twin of each part, which enables statistical studies of cooling hole geometry information across several parts in a family for generating more accurate part lifing models based on actual hole location and boundary data. By automatically identifying the locations and boundary geometry of cooling holes on a part and generating a set of toolpath instructions that allow a multi-axis robot to precisely and adaptively deposit or remove material in or around each cooling hole, the methods and systems described herein may serve to stream-line the component repair processes while simultaneously enhancing the quality of said repair process, and resulting repaired part. The processes described herein utilize the nominal design geometry of an engine component (e.g., a turbine blade or nozzle) in combination with three-dimensional scan data from a physical instance of the component.

This written description uses examples to disclose the present embodiments, including the best mode, and also to enable any person skilled in the art to practice the present embodiments, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method comprising:
    identifying a location of at least one hole of a plurality of holes disposed in a part of a turbomachine using a computer-aided design (CAD) model of the part;
    aligning the part in a mounting system;
    3D-scanning the part to obtain 3D measurement data;
    detecting at least one boundary feature of the at least one hole based at least partially on at least one datum from 3D-scanning the part;
    mapping a boundary geometry of the at least one hole on the part using the at least one boundary feature;
    generating a first toolpath based at least partially on the boundary geometry of the at least one hole at multiple depths, wherein the method automatically performs at least the identifying of the location, mapping of the boundary geometry, and generating of the first tool path;
    repairing the part at least partially according to the first toolpath to repair the at least one hole via material removal, material deposition, or a combination thereof;
    and generating a structured 3D point cloud using data from 3D-scanning the part, wherein the at least one hole comprises a cooling hole, and wherein detecting at least one boundary feature of the at least one cooling hole further comprises detecting at least one of: a cooling hole downstream corner, a cooling hole ramp portion, a cooling hole side wall, and a cooling hole free edge.

2. The method of claim 1, wherein repairing the part further comprises at least one of drilling, milling, machining, recoating, resurfacing, and reforming, and wherein each of the plurality of holes comprises a cooling hole along a hot gas path through the turbomachine.

3. The method of claim 1, further comprising:
defining a hole coordinate system,
wherein the hole coordinate system comprises a cylindrical coordinate system, wherein a centerline of a cylinder of the cylindrical coordinate system represents the location and orientation of a centerline of the at least one hole, and
wherein the diameter of the cylinder is representative of a bore diameter of the at least one hole.

4. The method of claim 1, wherein aligning the part in a mounting system further comprises aligning the part in a mounting system via a multi-axis robotic arm.

5. The method of claim 1 further comprising:
selecting at least one hole;
wherein the at least one hole selected meets at least one predetermined threshold, and
wherein a second 3D scan is performed on the selected at least one hole.

6. The method of claim 1, further comprising detecting a cooling hole ramp portion, wherein the cooling hole ramp portion forms a transition between a metering portion of the cooling hole and a substrate of the part.

7. The method of claim 1, further comprising detecting a cooling hole free edge,
wherein the cooling hole free edge forms a transition between a non-normal surface of the part and a substrate of the part, and
wherein substrate of the part has a normal surface orientation.

8. The method of claim 5, wherein detecting at least one boundary feature of the at least one hole further comprises detecting at least one boundary feature using surface normality data from the second 3D scan.

9. The method of claim 5, further comprising superimposing a first projection of a nominal hole boundary on a structured 3D point cloud from at least one of the original 3D scan and the second 3D scan.

10. The method of claim 9, wherein the nominal hole boundary is hull-shaped.

11. The method of claim 9, further comprising defining at least one offset between the first projection of a nominal hole boundary and the structured 3D point cloud;
wherein the at least one offset comprises at least one of a translation and a rotation.

12. The method of claim 11, further comprising:
refining and scaling the first projection using the at least one offset to generate a second projection, the second projection being a scaled version of the first projection; and
superimposing the second projection of a nominal hole boundary on the structured 3D point cloud from the second 3D scan.

13. The method of claim 12, further comprising:
removing at least one outlier data point,
wherein the at least one outlier data point comprises at least one of: a first portion of the structured 3D point cloud with normal surface orientation disposed within the second projection, and a second portion of the structured 3D point cloud with non-normal surface orientation disposed outside of the second projection.

14. The method of claim 13, further comprising rescaling the second projection following removal of the at least one outlier data.

15. The method of claim 12, wherein generating a first toolpath further comprises generating the first toolpath based at least partially on the second projection.

16. The method of claim 15, further comprising mapping the first toolpath on the structured 3D point cloud.

17. The method of claim 16, further comprising:
combining the first toolpath with at least one part geometry datum of the at least one hole to generate a second toolpath, wherein the second toolpath is a refined version of the first toolpath, and
wherein repairing the part at least partially according to the first toolpath further comprises repairing based at least partially on the second toolpath.

18. The method of claim 17, wherein the at least one part geometry datum of the at least one hole comprises:
a metering section;
a diffusing section downstream of the meter section; and
a throat portion,
wherein the throat portion transitions between the metering section and the diffusing section.

19. The method of claim 18, further comprising:
removing at least one outlier data point; and
rescaling the second projection following removal of the at least one outlier data,
wherein the at least one outlier data point comprises at least one of: a first portion of the structured 3D point cloud with normal surface orientation disposed within the second projection, and a second portion of the structured 3D point cloud with non-normal surface orientation disposed outside of the second projection,
wherein the at least one hole comprises a cooling hole,
wherein detecting at least one boundary feature of the at least one cooling hole further comprises detecting at least one of: a cooling hole downstream corner, a cooling hole ramp portion, a cooling hole side wall, and a cooling hole free edge, and
wherein the nominal hole boundary is hull-shaped.

20. The method of claim 1, wherein the mapping comprises iteratively refining the boundary geometry by selectively aligning, translating, rotating, scaling, and fitting the boundary geometry to the at least one hole.

21. The method of claim 1, comprising repeating the identifying of the location, detecting of the at least one boundary feature, mapping of the boundary geometry, generating of the first toolpath, and repairing for each hole of the plurality of holes, wherein the method comprises mapping the boundary geometry with one or more refinements to address deviations from a nominal cooling hole geometry and/or an expected location.

* * * * *